United States Patent
Stewart

(10) Patent No.: US 12,175,592 B2
(45) Date of Patent: Dec. 24, 2024

(54) LENGTH SCALE DIMENSION IN SPATIAL COORDINATE SYSTEMS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 363 days.

(21) Appl. No.: 17/701,913

(22) Filed: Mar. 23, 2022

(65) Prior Publication Data

US 2023/0306679 A1 Sep. 28, 2023

(51) Int. Cl.
  *G06T 15/10* (2011.01)
  *G06T 7/50* (2017.01)

(52) U.S. Cl.
  CPC .............. *G06T 15/10* (2013.01); *G06T 7/50* (2017.01); *G06T 2207/10028* (2013.01); *G06T 2207/10032* (2013.01); *G06T 2207/30181* (2013.01); *G06T 2215/16* (2013.01)

(58) Field of Classification Search
  CPC ............. G06T 2207/10028; G06T 7/50; G06T 2207/30181; G06T 15/10; G06T 2215/16; G06T 2207/10032; G06T 17/05; G06T 19/00
  See application file for complete search history.

(56) References Cited

U.S. PATENT DOCUMENTS

| | | | |
|---|---|---|---|
| 4,271,596 A | 6/1981 | Ganis | |
| 6,147,497 A | 11/2000 | Berryman et al. | |
| 7,136,093 B1 * | 11/2006 | Itoh | G06F 16/9537 |
| | | | 348/333.01 |
| 7,525,873 B1 * | 4/2009 | Bush | G01V 1/28 |
| | | | 367/47 |
| 2004/0141414 A1 * | 7/2004 | Huffman | G01V 1/306 |
| | | | 367/51 |
| 2013/0018640 A1 * | 1/2013 | Etgen | G01V 1/30 |
| | | | 703/2 |

(Continued)

OTHER PUBLICATIONS

International Search Report and Written Opinion in International Appln. No. PCT/US2023/015904, mailed on Jun. 16, 2023, 17 pages.

(Continued)

*Primary Examiner* — Phi Hoang
(74) *Attorney, Agent, or Firm* — Fish & Richardson P.C.

(57) ABSTRACT

Systems and methods include a computer-implemented method for determining and storing a length scale dimension in spatial coordinate systems. A mapping of three-dimensional (3D) grid locations (x,y,z) relative to a continuous surface of the Earth is determined. The 3D grid locations have a grid point spacing in an (x,y) space defining map view coordinates of the continuous surface independent of an elevation z. A length scale (l) is determined for each 3D location. The length scale defines a 3D distance between 3D grid locations, and also defines a structural or geometrical length scale at the 3D location relevant to a given task. Then, (x,y,z,l) information is stored for each 3D grid location. The (x,y,z,l) information defines, for each (x,y) coordinate, a z-coordinate defining an elevation of the continuous surface at the (x,y) coordinate and the local length scale at the (x,y,z) coordinate.

17 Claims, 4 Drawing Sheets

(56) References Cited

U.S. PATENT DOCUMENTS

2014/0009626 A1* 1/2014 Schultz ............... G06T 11/203
348/207.1

OTHER PUBLICATIONS

Mann "Progressive Sampling—A new realization of a method for interactive data collection for digital elevation models on analytical plotters," Proc. 16., ISPRS Congress, Kyoto, Comm. II, IAPRS, Jan. 1988, 7 pages.

Papo et al., "Digital Terrain 1-20 Models for Slopes and Curvatures," Photogrammetric engineering and remote sensing, Jun. 1984, 50(6):7 pages.

Weinacker et al., "Treesvis—A Software System for Simultaneous 3d-Real-Time Visualisation of DTM, DSM, Laser Raw Data, Multispectral Data, Simple Tree and Building Models," International Archives of Photogrammetry, Remote Sensing and Spatial Information Sciences, Oct. 2004, XXXVI:6 pages.

Wilson et al., "Multi scale Terrain Analysis of Multibeam Bathymetry Data for Habitat Mapping on the Continental Slope," Marine Geodesy, May 2007, 30:33 pages.

Bergbauer et al., "Improving curvature analyses of deformed horizons using scale-dependent filtering techniques," American Association of Petroleum Geologists Bulletin, Aug. 2003, 87(8):1255-1272, 18 pages.

Carmichael et al., "Method and analysis for the upscaling of structural data," Journal of Structural Geology, Feb. 2016, 83:121-133, 47 pages.

Lisle et al., "The Mohr circle for curvature and its application to fold description," Journal of Structural Geology, May 1995, 17(5):739-750, 12 pages.

Minar et al., "A comprehensive system of definitions of land surface (topographic) curvatures, with implications for their application in geoscience modelling and prediction," Earth-Science Reviews, Dec. 2020, 211:103414, 24 pages.

Stewart, "Generalization and multiscale structure of subsurface structural maps," Interpretation, Oct. 2018, 6(4):T1045-T1054, 10 pages.

Stewart, "Scale dependence of strike and dip in sedimentary basins: Implications for field measurements and integrating subsurface datasets," Journal of Structural Geology, Feb. 2020, 131:103943, 21 pages.

* cited by examiner

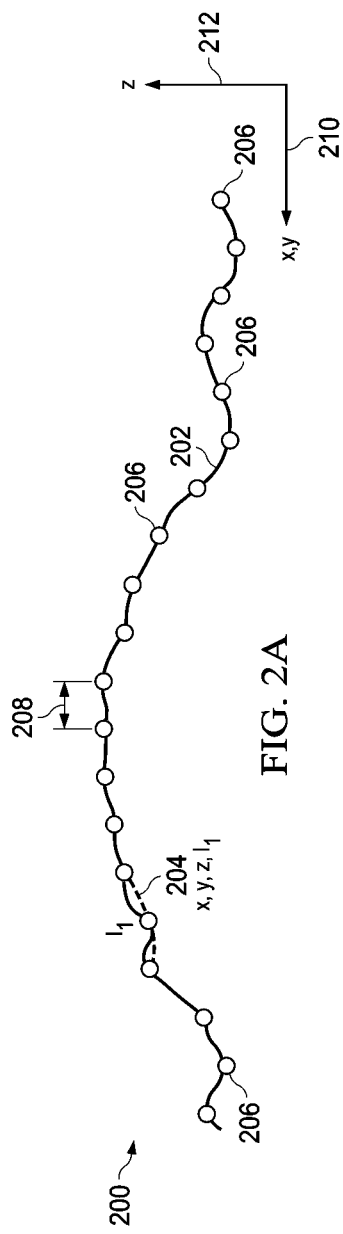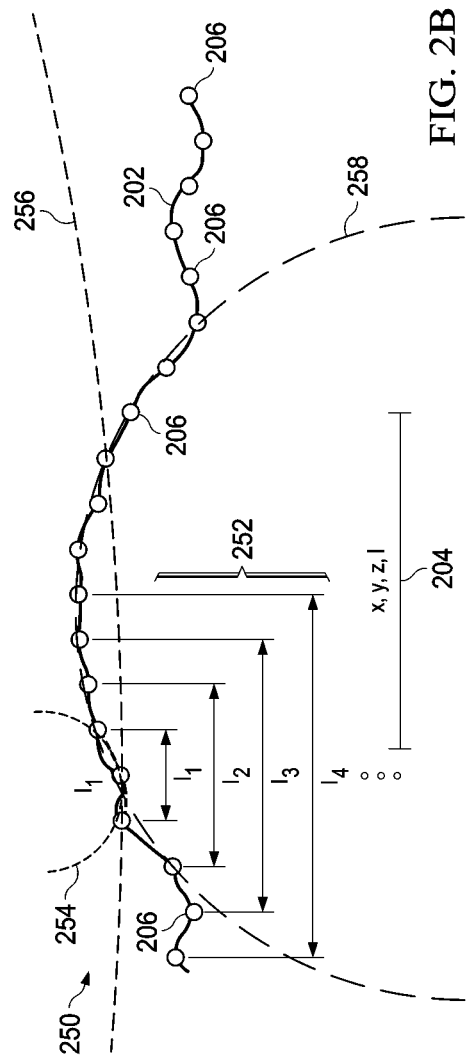

LENGTH SCALE DIMENSION IN SPATIAL COORDINATE SYSTEMS

TECHNICAL FIELD

The present disclosure applies to storage of topographic or geological structural information, such as in numerical arrays or grids.

BACKGROUND

Cartographic maps and related information systems such as those utilized in mineral and hydrocarbon exploration and carbon dioxide ($CO_2$) subsurface sequestration are typically designed to contain topographic or structural information stored as numerical grids. The grids are typically arranged in such a way that there are three spatial coordinates consisting of two map-view coordinates and a depth or elevation coordinate. Digital storage systems can be set up such that each grid node may carry one or more attributes that are relevant to the utilization of the grid.

SUMMARY

The present disclosure describes techniques that can be used for determining and storing a length scale dimension in spatial coordinate systems. In some implementations, a computer-implemented method includes the following. A mapping of three-dimensional (3D) grid locations (x,y,z) relative to a continuous surface of the Earth is determined. The 3D grid locations have a grid point spacing in an (x,y) space defining map view coordinates of the continuous surface independent of an elevation z. A length scale (l) is determined for each 3D location. The length scale defines a 3D distance between 3D grid locations, and also defines a structural or geometrical length scale at the 3D location relevant to a given task. Then, (x,y,z,l) information is stored for each 3D grid location. The (x,y,z,l) information defines, for each (x,y) coordinate, a z-coordinate defining an elevation of the continuous surface at the (x,y) coordinate and the local length scale at the (x,y,z) coordinate.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques of the present disclosure can be used to solve two types of technical problems in related applications of conventional systems. First, the techniques can prevent or eliminate mismatches between information portrayed in maps and the required information in standardized mapping systems, e.g., where the map should be relevant to the issue for which the map is made. Second, the techniques of the present disclosure can facilitate the standardization of mapping products so that maps from all users, input data, and mapping systems can have the same look and feel, without which the purpose of a set of maps may not be met since comparisons cannot be easily made. The techniques of the present disclosure can facilitate the incorporation of an explicit length scale parameter into numerical grid arrays, and the parameter can be carried throughout all grid manipulations in different mapping processes. The techniques of the present disclosure can solve limitations in conventional systems having a multi-scale nature of topography and geological surfaces, e.g., by eliminating questions around the relevance of specifying a length scale. Length scale-specific maps may be provided by conventional systems but only through the indirect methods of spatial filtering to isolate specific length scales that become apparent in map view. Adapting numerical grids to incorporate a length scale parameter can be supported using techniques of the present disclosure. Conventional systems typically do not provide for recording length scale as an integral part of spatial coordinate systems, so neither the geometrical form nor associated scale-dependent attributes can be captured in grid systems without external metadata. Techniques of the present disclosure can be used to provide an association or a hard connection between spatial information, length scale, and scale-dependent attributes. Conventional systems may also be designed based on the concept that length scale should not be incorporated as a spatial dimension in numerical coordinate systems. A requirement for length scale specification in spatial systems also facilitates workflow efficiency since it forces mappers to select the appropriate scale of spatial information in the first pass of mapping.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2A and 2B are diagrams showing examples of multiscale structures, according to some implementations of the present disclosure.

Like reference numbers and designations in the various drawings indicate like elements.

DETAILED DESCRIPTION

Figure 1:
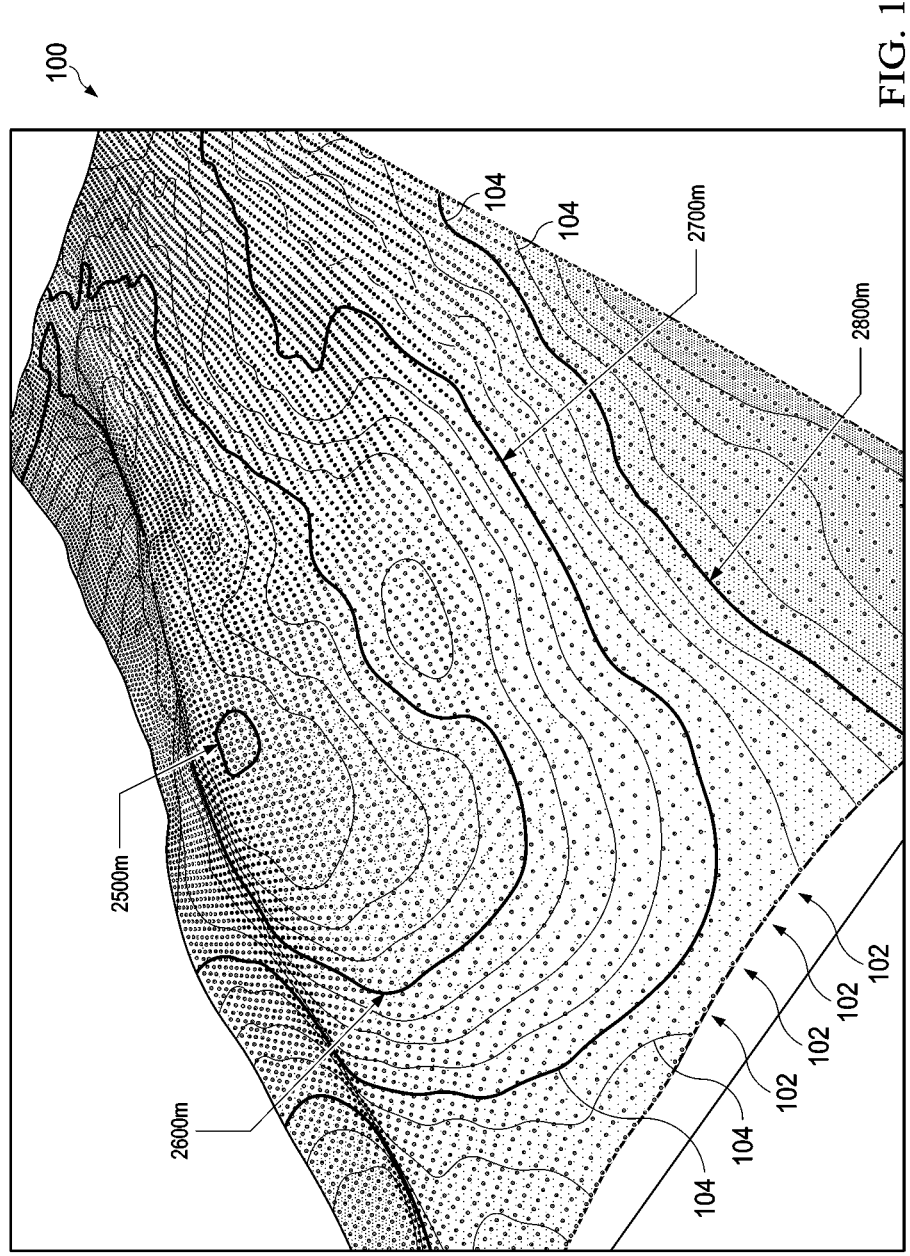
FIG. 1 is a diagram showing an example of a typical surface geological structure 100, according to some implementations of the present disclosure.

The following detailed description describes techniques for determining and storing a length scale dimension in spatial coordinate systems. Various modifications, alterations, and permutations of the disclosed implementations can be made and will be readily apparent to those of ordinary skill in the art, and the general principles may be applied to other implementations and applications, without departing from the defined scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can include a method for storing information within numerical grid manipulation systems that relates to spatial length scales. A system and method can be used for ensuring that spatial length scales are explicitly related to spatial location information. A system and method can be used for ensuring that, through explicit specification of spatial length scales, the use of numerical spatial grids is tuned to be relevant to the requirements of mapping projects while remaining consistent between different users and data types.

Techniques of the present disclosure can be based on a recognition that, for many purposes of mapping ostensibly three-dimensional information such as topography or geological structure, there may be a multiscale hierarchy of structural information present in terms of the geometry of the mapped surface and related scale-dependent attributes such as curvature. Objects consisting of one or more dimensions are typically constructed by joining together points in space that are zero-dimensional. As such, the representation of higher-dimensional objects is not explicitly specified in coordinate systems and must be implied by interpretative methods, e.g., based on information restrictions such as grid node spacing or grid filtering. This is evident in FIG. 1, where the computer software constructs a 3D surface by fitting contours to the data points (e.g., black dots) and by color shading the result, assuming that a minimum-curvature fit is the correct representation of the information held at the black dot grid points. This type of analysis can involve significant work and may be time-consuming. Problems with such analysis can be solved, for example, by specifying coordinate system layouts that explicitly include a spatial dimension parameter. The coordinate system layouts can be applied to sparse, irregularly-sampled data such as individual survey locations such as field outcrops of rock strata, or densely sampled data such as lidar or three-dimensional (3D) reflection seismic surveys. Use of coordinate systems defined in four-spatial dimensions, one of which is a length scale parameter, forces the data acquisition process to recognize and record the spatial length scale dimension that is apparent or deemed to be relevant to the characterization job at hand. In the case of automated data collection, such as reflection seismic surveys, an initial length scale parameter can be assigned based on the spatial sampling interval. The assignment can constitute a low-pass filter, for example. Incorporation of an explicit length scale parameter into grid arrays that store topographic and geological structure information can greatly assist subsequent utility of the information, such as by reducing or removing the need for band-pass filtering.

In general, points defined in 3D coordinate systems are locations and the points themselves are zero-dimensional. Definition of higher-dimensional objects such as lines and planes require sets of points to be joined or grouped together in some way, usually termed an "interpretation" and stored separately, for example, as a subset of the original grid. Many natural phenomena that lend themselves to digital mapping, such as topography and subsurface geological layers, are well-known to be multiscale in nature. In these techniques, local detail is superimposed on longer-length scale structure such as regional slopes. There can be two common routes for handling multiscale signals in such data. First, the multiscale aspect can be ignored, resulting in inconsistent treatment of signals at different length scales. This can be typically manifested as contour maps from different mapping personnel appearing different in style and content even though they are produced from similar or even the same data. Second, data can be processed in some way to isolate information at specific length scales. This might include band-pass filtering using, for example, smoothing filters or fast Fourier transforms. These types of processing may add significant time and effort to the data utilization workflow.

To build on the general techniques of 3D coordinate systems, techniques of the present disclosure can include configuring digital storage systems for spatial information in such a way that a length scale parameter can be assigned in any data set that represents spatial information. Making this type of assignment has the dual benefit of forcing the consideration of length scale up front in the data acquisition process. This can lead to a more efficient and possibly cheaper data acquisition workflow, resulting in more efficient and consistent data utilization.

Surfaces in geoscience such as topography and subsurface geological structure (e.g., as shown in FIG. 1) are continuous. Local breaks may exist where cliffs or geological faults are present. In any case, the surfaces contain multiscale structural information. This multiscale information can be truncated at the shortest length scale in the dataset. Truncation can be done by selecting an appropriate lateral spatial sampling interval of the numerical grid (e.g., a Nyquist limit) and at the longest length scale by the extents of the grid itself.

FIG. 1 is a diagram showing an example of a typical surface geological structure 100, according to some implementations of the present disclosure. FIG. 1 shows an underlying data structure (e.g., depicted as black dots) containing the spatial information. The contour lines and color shading of FIG. 1 are a rendered overlay created on-the-fly by mapping software for display purposes. Sample points 102, shown as black dots, are equally spaced on the horizon shown by the subsurface geological structure 100. The sample points 102 identify locations of numerical spatial information (e.g., in x,y,z coordinates of grid points at which x,y,z information is stored) representing the surface in mapping systems. The sample points 102 can be 100 meters apart, for example, and may be derived from interpretation of 3D reflection seismic data, for example. The spatial information contained in these sample points may be relevant to several different length scales (as described with reference to FIGS. 2A and 2B). If the numerical grid is restricted to three spatial components (e.g., in x,y,z coordinates), then there is no indication of what structural information in terms of length scale may be present in the grid, other than the characteristics of the grid mentioned above (e.g., sample spacing and grid extent). In FIG. 1, shading of contours 104 (e.g., at 25 meter (m) contour intervals) of the surface geological structure 100 represents a reconstruction of an actual, continuous surface of the Earth at that location. This reconstruction is usually arbitrary in that it is done by contouring algorithms within software that operates on-the-fly and create contours assuming minimum curvature of a continuous surface that passes through all of the sample points.

Using techniques of the present disclosure, the numerical grid is expanded by one spatial parameter, length scale, and therefore has the form x,y,z,l (where l is length). In some cases, the spatial length scale parameter can take a default value corresponding to the Nyquist wavelength related to the grid node spacing. In other cases, the spatial length scale parameter can take a larger value, which can, at the discretion of the user, relate to the geometry of the grid itself or could relate to additional scale-dependent parameters such as curvature. The case of the geometry of the grid (as represented in the elevation parameter z) relating to a specific length scale occurs, for example, if the processing of the structure in the grid creation process involves removal of certain structural wavelengths. For example, the process can include low pass filtering (e.g., smoothing), which is a common step in gridding algorithms. In another example, the process can include band-pass filtering to isolate specific structural information, for instance removing short wavelength "noise" and long wavelength regional structure. In some implementations, it is sufficient for the numerical grid storage format (e.g., an array) to solely consist of the four spatial coordinates x,y,z,l. For example, this would be appropriate where purely topographic, or structural information, is of interest (e.g., as described in FIG. 3, Case One 302). In other implementations, length-scale specific information, such as curvature, can be added as a further parameter (e.g., as described in FIG. 3, Case Two 304). There is no restriction on the number of length-scale specific parameters that can be configured in a grid array. Maximum curvature is just one example of a scale-dependent property. There are many other properties that can be stored either in other arrays, or the same array with multiple different data elements tied back to the same x,y,z,l point. An example is x,y,z,l,k1,k2, k3,k4,k5, . . . , where the k parameters are whatever scale-dependent properties relevant to the job at hand. The combination of the spatial length scale parameter and the scale-dependent information (e.g., at least curvature, porosity, and permeability) is a specific description that is not possible without the length scale parameter. In addition to enhancing the capability of grid manipulation systems (e.g. petro-technical mapping software) to specify scale-dependent information, configuration of grid arrays in this way would force users to consider and quantify the length scale relevant to the job at hand.

There are two main advantages of using techniques of the present disclosure. First, explicit consideration of length scale can ensure that the mapping is relevant to the length scale concerned with the task at hand. For example, subsurface mapping for oil and gas exploration, or $CO_2$ sequestration, is concerned with structure at a length scale at a distance in a range of kilometers to tens of kilometers. In this example, shorter length scale structure can be considered separately because it may be of interest from a seal integrity viewpoint. In this case, longer wavelength structure is not relevant unless regional aquifer dynamics are a concern. In either of these two cases, the shorter and longer wavelength information can be stored in separate four-component grids specific to that length scale. The second advantage is that the approach ensures that all mapping products (e.g., used by different users, or sourced from different input data, or both) are consistent in their appearance and relevance to the task at hand, ensuring ease of further use, e.g., by decision-makers.

FIGS. 2A and 2B are diagrams showing examples of multiscale structures 200 and 250, according to some implementations of the present disclosure. Referring to FIG. 2A, the multiscale structure 200 is generated onto an actual subsurface horizon 202. The multiscale structure 200 contains information in addition to the structure itself, for instance curvature at different local length scales 204 (e.g., x,y,z,$l_1$). Grid nodes 206 have a grid point spacing (s) 208.

The multiscale structure 200 is depicted as a side view of sorts, so the grid nodes 206 are positioned relative to x,y coordinate 210 and a z coordinate 212.

Referring to FIG. 2B, the multiscale structure 250 is generated from, and stored in relation to, the actual subsurface horizon 202. The multiscale structure 250 contains information relating to structure (curvature) using different length scale dimensions 252 (e.g., $l_1$,$l_2$, and so on). The multiscale structure 250 is generated relative to properties 254 at local scale (e.g., curvature), a basin-scale curvature 256, and a regional curvature 258. The relative magnitudes and nomenclatures of these curvature components is arbitrary and for illustrative purposes only. It is important to note that the positional information, in particular the elevation/depth parameter z, may or may not be adjusted in accordance with the length scale specified in parameter l. This is at the discretion of the user and/or implemented workflow because the demands of a given project will determine whether hard data points such as field observation locations should have their spatial locations adjusted to represent structure or parameters at a given scale. In any case, the specification of length scale parameter l provides a solution by giving an option to separate length-scale information from the elevation/depth parameter.

Figure 3:
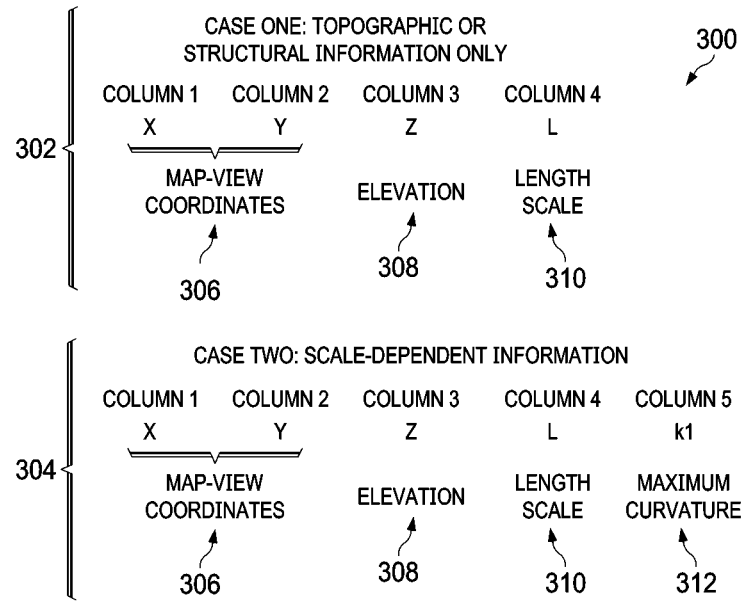
FIG. 3 is a diagram showing example cases using different length scale dimension techniques, according to some implementations of the present disclosure.

FIG. 3 is a diagram showing example cases 302 and 304 using different length scale dimension techniques, according to some implementations of the present disclosure. Each of the cases 302 and 304 uses data array structure to explicitly contain length scale information relating to structure (Case One 302) or scale-dependent attributes (Case Two 304). Both cases 302 and 304 uses x,y,z coordinates as columns 1,2,3 for map-view coordinates x,y 306 and an elevation z 308. In the Case One 302, column 4 is a length scale 310. In the Case Two 304, column 4 is the length scale 310, and column 5 is a maximum curvature (k1) 312. Further cases can include additional columns with information (properties) relating to that length scale.

Figure 4:
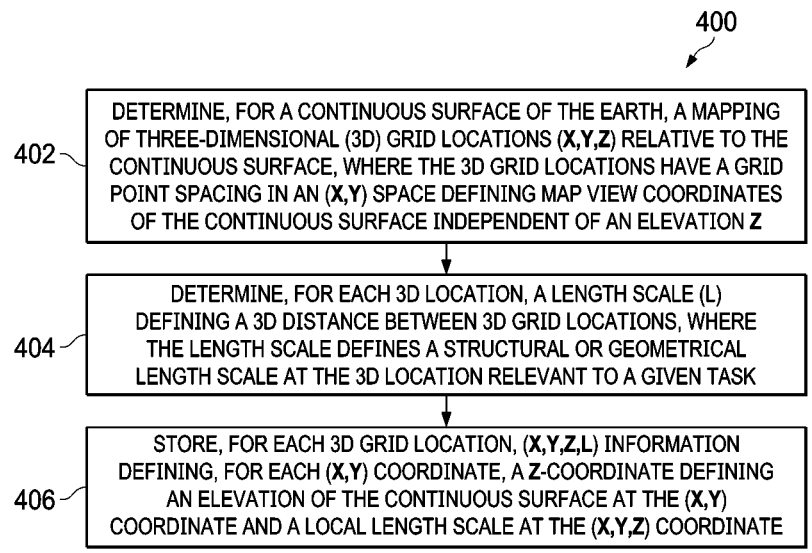
FIG. 4 is a flowchart of an example of a method for determining and storing length scale dimensions in spatial coordinate systems, according to some implementations of the present disclosure.

FIG. 4 is a flowchart of an example of a method 400 for determining and storing length scale dimensions in spatial coordinate systems, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order. Examples provided relative to method 400 are based on the use of maximum curvature, which is just one example of a scale-dependent attribute or parameter that can be stored. There are many other types of curvature and non-geometrical properties, such as porosity, permeability, mechanical properties, and so on.

At 402, a mapping of three-dimensional (3D) grid locations (x,y,z) relative to a continuous surface of the Earth is determined. The 3D grid locations can have a grid point spacing in an (x,y) space defining map view coordinates of the continuous surface independent of an elevation z. For example, as shown in FIG. 1, the surface geological structure 100 can include sample points 102 that are equally spaced on the horizon shown by the subsurface geological structure 100. The sample points 102 can identify locations of numerical spatial information (e.g., in the x,y,z coordinates of grid points at which x,y,z information is stored) representing the surface in mapping systems. From 402, method 400 proceeds to 404.

At 404, a length scale (l) is determined for each 3D location. The length scale defines a 3D distance between 3D grid locations, and also defines a structural or geometrical length scale at the 3D location relevant to a given task. The length scale values (1) can be any multiple of grid location spacing and can correspond to the local length scale values described with reference to FIGS. 2A and 2B, for example. The local length scale can be determined using available information in an intrinsic approach, such as using the properties 254 (e.g., curvature) at a local scale. The local length scale can further or alternatively be based on an extrinsic perspective, such as "what is the structural or geometrical length scale that is of interest?"

The basin-scale curvature 254 is an example of a long-wavelength (e.g., large-scale) curvature that may be of interest in some applications. Geological basins can be, for example, in the 10's to 100's kilometers (km) length scale range. At these length scales, the curvature of the Earth also becomes significant. For example, the regional curvature 258 is a generic notion of long-wavelength/large-scale/far-field structure. From 404, method 400 proceeds to 406.

At 406, (x,y,z,l) information is stored for each 3D grid location. The (x,y,z,l) information defines, for each (x,y) coordinate, a z-coordinate defining an elevation or depth of the continuous surface at the (x,y) coordinate and the length scale l at the (x,y,z) coordinate that is relevant to the job at hand. For example, the (x,y,z,l) information described with reference to FIGS. 2A and 2B can be stored. The information can be accessed and used in various applications, such as in oil exploration or other areas. After 406, method 400 can stop.

In some implementations, method 400 further includes determining curvatures for (x,y,z) coordinates. For example, a maximum curvature k can be determined at each 3D grid location. The maximum curvature k for the 3D grid location can be stored with the (x,y,z,l) information. In some implementations, determining the maximum curvature k at each 3D grid location includes: fitting a circle or a sphere to adjacent grid nodes in a discretized version of spatial information for the 3D grid location, and determining a radius of the circle or the sphere as a radius of curvature of the circle or the sphere. Curvature is just one example of a scale-dependent property that can be stored.

In some implementations, method 400 further includes presenting a user interface to a user that facilitates the selection of length scale parameter (which is usually constant in a given grid). The length scale parameter could be presented on the screen in a true scale or as a slider that the user manipulates. If relevant, the grid information can be interactively updated on the screen. For example, if elevation z was tied to structural wavelength 1, then by using the length scale slider, the user can make a visually-informed decision on optimizing the length scale parameter l.

In some implementations, in addition to (or in combination with) any previously-described features, techniques of the present disclosure can include the following. Customized user interfaces can present intermediate or final results of the above described processes to a user. The presented information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change or an improvement in drilling parameters (including speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 5:
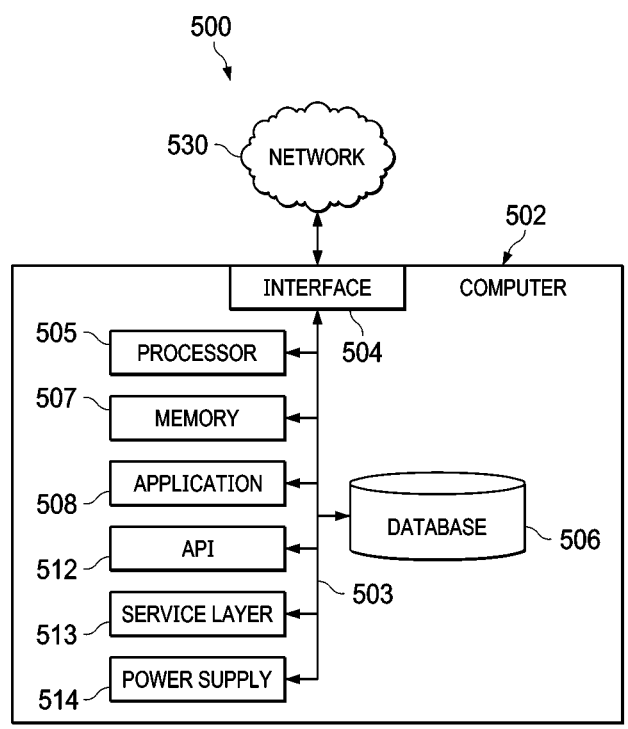
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A mapping of three-dimensional (3D) grid locations (x,y,z) relative to a continuous surface of the Earth is determined. The 3D grid locations have a grid point spacing in an (x,y) space defining map view coordinates of the continuous surface independent of an elevation z. A length scale (l) is determined for each 3D location. The length scale defines a 3D distance between 3D grid locations, and also defines a structural or geometrical length scale at the 3D location relevant to a given task. Then, (x,y,z,l) information is stored for each 3D grid location. The (x,y,z,l) information defines, for each (x,y) coordinate, a z-coordinate defining an elevation of the continuous surface at the (x,y) coordinate and the local length scale at the (x,y,z) coordinate.

The foregoing and other described implementations can each, optionally, include one or more of the following features:

A first feature, combinable with any of the following features, the method further including: determining at least one property of interest at the specified length scale, wherein the at least one property includes a maximum curvature k (as a function of l) at each 3D grid location; and storing, with the (x,y,z,l) information, the maximum curvature k for the 3D grid location.

A second feature, combinable with any of the previous or following features, where determining the maximum curvature k as a function of length scale l, at each 3D grid location includes: fitting a circle or a sphere to adjacent grid nodes in a discretized version of spatial information for the 3D grid location; and determining a radius of the circle or the sphere as a radius of a curvature of the circle or the sphere.

A third feature, combinable with any of the previous or following features, where the local length scale is computed based, at least in part, on a basin-scale curvature at each grid point.

A fourth feature, combinable with any of the previous or following features, where the local length scale is computed based, at least in part, on regional curvatures at the grid point.

A fifth feature, combinable with any of the previous or following features, the method further including presenting a user interface for display to a user that facilitates the selection of the length scale parameter.

A sixth feature, combinable with any of the previous or following features, where the length scale parameter is presented in the user interface as one or both of a true scale and as a slider that the user manipulates.

In a second implementation, a non-transitory, computer-readable medium stores one or more instructions executable by a computer system to perform operations including the following. A mapping of three-dimensional (3D) grid locations (x,y,z) relative to a continuous surface of the Earth is determined. The 3D grid locations have a grid point spacing in an (x,y) space defining map view coordinates of the continuous surface independent of an elevation z. A length scale (l) is determined for each 3D location. The length scale defines a 3D distance between 3D grid locations, and also defines a structural or geometrical length scale at the 3D location relevant to a given task. Then, (x,y,z,l) information is stored for each 3D grid location. The (x,y,z,l) information defines, for each (x,y) coordinate, a z-coordinate defining an elevation of the continuous surface at the (x,y) coordinate and the local length scale at the (x,y,z) coordinate.

The foregoing and other described implementations can each, optionally, include one or more of the following features:

A first feature, combinable with any of the following features, the operations further including: determining at least one property of interest at the specified length scale, wherein the at least one property includes a maximum curvature k (as a function of l) at each 3D grid location; and storing, with the (x,y,z,l) information, the maximum curvature k for the 3D grid location.

A second feature, combinable with any of the previous or following features, where determining the maximum curvature k as a function of length scale l, at each 3D grid location includes: fitting a circle or a sphere to adjacent grid nodes in a discretized version of spatial information for the 3D grid location; and determining a radius of the circle or the sphere as a radius of a curvature of the circle or the sphere.

A third feature, combinable with any of the previous or following features, where the local length scale is computed based, at least in part, on a basin-scale curvature at each grid point.

A fourth feature, combinable with any of the previous or following features, where the local length scale is computed based, at least in part, on regional curvatures at the grid point.

A fifth feature, combinable with any of the previous or following features, the operations further including presenting a user interface for display to a user that facilitates the selection of the length scale parameter.

A sixth feature, combinable with any of the previous or following features, where the length scale parameter is presented in the user interface as one or both of a true scale and as a slider that the user manipulates.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A mapping of three-dimensional (3D) grid locations (x,y,z) relative to a continuous surface of the Earth is determined. The 3D grid locations have a grid point spacing in an (x,y) space defining map view coordinates of the continuous surface independent of an elevation z. A length scale (l) is determined for each 3D location. The length scale defines a 3D distance between 3D grid locations, and also defines a structural or geometrical length scale at the 3D location relevant to a given task. Then, (x,y,z,l) information is stored for each 3D grid location. The (x,y,z,l) information defines, for each (x,y) coordinate, a z-coordinate defining an elevation of the continuous surface at the (x,y) coordinate and the local length scale at the (x,y,z) coordinate.

The foregoing and other described implementations can each, optionally, include one or more of the following features:

A first feature, combinable with any of the following features, the operations further including: determining at least one property of interest at the specified length scale, wherein the at least one property includes a maximum curvature k (as a function of l) at each 3D grid location; and storing, with the (x,y,z,l) information, the maximum curvature k for the 3D grid location.

A second feature, combinable with any of the previous or following features, where determining the maximum curvature k as a function of length scale l, at each 3D grid location includes: fitting a circle or a sphere to adjacent grid nodes in a discretized version of spatial information for the 3D grid location; and determining a radius of the circle or the sphere as a radius of a curvature of the circle or the sphere.

A third feature, combinable with any of the previous or following features, where the local length scale is computed based, at least in part, on a basin-scale curvature at each grid point.

A fourth feature, combinable with any of the previous or following features, where the local length scale is computed based, at least in part, on regional curvatures at the grid point.

A fifth feature, combinable with any of the previous or following features, the operations further including presenting a user interface for display to a user that facilitates the selection of the length scale parameter.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks.

Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
determining, for a continuous geological surface, a mapping of three-dimensional (3D) grid locations (x,y,z) relative to the continuous geological surface, wherein the 3D grid locations have a grid point spacing in an (x,y) space defining map view coordinates of the continuous geological surface independent of an elevation z;
determining, for each 3D location, a length scale defining a 3D distance between 3D grid locations, wherein the length scale defines a structural length scale or a geometrical length scale at the 3D location relevant to a given task;
determining at least one property of interest at the length scale, wherein the at least one property comprises a maximum curvature k as a function of the length scale at each 3D grid location; and
storing, for each 3D grid location, information defining, for each (x,y) coordinate, a z-coordinate defining an elevation of the continuous geological surface at the (x,y) coordinate, a local length scale at the (x,y,z) coordinate and, the maximum curvature k for the 3D grid location.

2. The computer-implemented method of claim 1, wherein determining the maximum curvature k as a function of length scale, at each 3D grid location comprises:
fitting a circle or a sphere to adjacent grid nodes in a discretized version of spatial information for the 3D grid location; and
determining a circle radius or a sphere radius as a radius of a curvature of the circle or the sphere.

3. The computer-implemented method of claim 1, wherein the local length scale is computed based, at least in part, on a basin-scale curvature at the grid point.

4. The computer-implemented method of claim 1, wherein the local length scale is computed based, at least in part, on regional curvatures at the grid point.

5. The computer-implemented method of claim 1, further comprising:
presenting a user interface for display to a user that facilitates a selection of a length scale parameter.

6. The computer-implemented method of claim 5, wherein the length scale parameter is presented in the user interface as one or both of a true scale and as a slider that the user manipulates.

7. A non-transitory, computer-readable medium storing one or more instructions executable by a computer system to perform operations comprising:
determining, for a continuous geological surface, a mapping of three-dimensional (3D) grid locations (x,y,z) relative to the continuous geological surface, wherein the 3D grid locations have a grid point spacing in an (x,y) space defining map view coordinates of the continuous geological surface independent of an elevation z;
determining, for each 3D location, a length scale defining a 3D distance between 3D grid locations, wherein the length scale defines a structural length scale or a geometrical length scale at the 3D location relevant to a given task;
determining at least one property of interest at the length scale, wherein the at least one property comprises a maximum curvature k as a function of the length scale at each 3D grid location; and
storing, for each 3D grid location, information defining, for each (x,y) coordinate, a z-coordinate defining an elevation of the continuous geological surface at the (x,y) coordinate, a local length scale at the (x,y,z) coordinate and, the maximum curvature k for the 3D grid location.

8. The non-transitory, computer-readable medium of claim 7, wherein determining the maximum curvature k as a function of length scale, at each 3D grid location comprises:
fitting a circle or a sphere to adjacent grid nodes in a discretized version of spatial information for the 3D grid location; and
determining a circle radius or a sphere radius as a radius of a curvature of the circle or the sphere.

9. The non-transitory, computer-readable medium of claim 7, wherein the local length scale is computed based, at least in part, on a basin-scale curvature at the grid point.

10. The non-transitory, computer-readable medium of claim 7, wherein the local length scale is computed based, at least in part, on regional curvatures at the grid point.

11. The non-transitory, computer-readable medium of claim 7, the operations further comprising:
presenting a user interface for display to a user that facilitates a selection of a length scale parameter.

12. The non-transitory, computer-readable medium of claim 11, wherein the length scale parameter is presented in the user interface as one or both of a true scale and as a slider that the user manipulates.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
determining, for a continuous geological surface, a mapping of three-dimensional (3D) grid locations (x,y,z) relative to the continuous geological surface, wherein the 3D grid locations have a grid point spacing in an (x,y) space defining map view coordinates of the continuous geological surface independent of an elevation z;
determining, for each 3D location, a length scale defining a 3D distance between 3D grid locations, wherein the length scale defines a structural length scale or a geometrical length scale at the 3D location relevant to a given task;
determining at least one property of interest at the length scale, wherein the at least one property comprises a maximum curvature k as a function of the length scale at each 3D grid location; and
storing, for each 3D grid location, information defining, for each (x,y) coordinate, a z-coordinate defining an elevation of the continuous geological surface at the (x,y) coordinate, a local length scale at the (x,y,z) coordinate and, the maximum curvature k for the 3D grid location.

14. The computer-implemented system of claim 13, wherein determining the maximum curvature k as a function of length scale, at each 3D grid location comprises:

fitting a circle or a sphere to adjacent grid nodes in a discretized version of spatial information for the 3D grid location; and determining a circle radius or a sphere radius as a radius of a curvature of the circle or the sphere.

15. The computer-implemented system of claim 13, wherein the local length scale is computed based, at least in part, on a basin-scale curvature at the grid point.

16. The computer-implemented system of claim 13, wherein the local length scale is computed based, at least in part, on regional curvatures at the grid point.

17. The computer-implemented system of claim 13, the operations further comprising:

presenting a user interface for display to a user that facilitates a selection of a length scale parameter.

* * * * *